United States Patent [19]
Taniai et al.

[11] Patent Number: 5,517,653
[45] Date of Patent: May 14, 1996

[54] SEMICONDUCTOR INTEGRATED CIRCUIT DEVICE WHICH CONTROLS THE ACTIVATION OF A MICROPROGRAM AND THE START ADDRESS

[75] Inventors: Takayoshi Taniai, Kawasaki; Tatsuya Nagasawa, Sagamihara, both of Japan

[73] Assignee: Fujitsu Limited, Kanagawa, Japan

[21] Appl. No.: 888,326

[22] Filed: May 26, 1992

Related U.S. Application Data

[63] Continuation of Ser. No. 327,475, Mar. 22, 1989, abandoned.

[30] Foreign Application Priority Data

Mar. 25, 1988 [JP] Japan .................. 63-71426

[51] Int. Cl.⁶ .............. G06F 9/24; G06F 9/26; G06F 9/06; G06F 9/44
[52] U.S. Cl. .............. 395/800; 364/221.7; 364/229.5; 364/231.6; 364/231.7; 364/234.3; 364/239.4; 364/239.5; 364/239.8; 364/239.9; 364/241.2; 364/242.1; 364/242.32; 364/242.31; 364/262.8; 364/267.4; 364/267.8; 364/DIG. 1; 364/DIG. 2; 395/375
[58] Field of Search .............. 395/800, 375, 395/325, 425, 275, 250, 200, 500, 775, 497.03, 550; 364/DIG. 1, DIG. 2

[56] References Cited

U.S. PATENT DOCUMENTS

| | | |
|---|---|---|
| 4,227,245 | 10/1980 | Edblad et al. .................. 364/200 |
| 4,275,441 | 6/1981 | Takeuchi . |
| 4,521,858 | 6/1985 | Kraemer et al. .................. 395/375 |
| 4,677,586 | 6/1987 | Magar et al. . |
| 4,679,138 | 7/1987 | Epstein et al. .................. 395/375 |
| 4,751,727 | 6/1988 | Brahm et al. .................. 379/94 |
| 4,835,738 | 5/1989 | Niehaus et al. .................. 395/425 |
| 4,875,160 | 10/1989 | Brown, III .................. 364/200 |
| 4,875,161 | 10/1989 | Lahti .................. 364/200 |
| 4,891,754 | 1/1990 | Boreland .................. 395/375 |

OTHER PUBLICATIONS

"An Interactive Diagnostic/Debugging Subsystem for Bit–slice Processors" F. J. Burkowski, IEEE, 18th Annual Workshop on Microprogramming, Dec. 3-6, 1985, pp. 35–46.

*Primary Examiner*—Daniel Pan
*Attorney, Agent, or Firm*—Nikaido, Marmelstein, Murray & Oram

[57] ABSTRACT

A semiconductor integrated circuit device includes a memory storing a microprogram used for controlling a desired function, a generator for generating an internal microprogram activating signal. A switching part selects either one of an external microprogram activating signal generated by an external device and the internal microprogram activating signal generated by the generator based on a first signal supplied from outside of the semiconductor integrated circuit device, thereby outputting a selected microprogram activating signal. A microaddress generator generates a microaddress of the microprogram stored in the memory. The microaddress generator is activated by the selected microprogram activating signal.

19 Claims, 6 Drawing Sheets

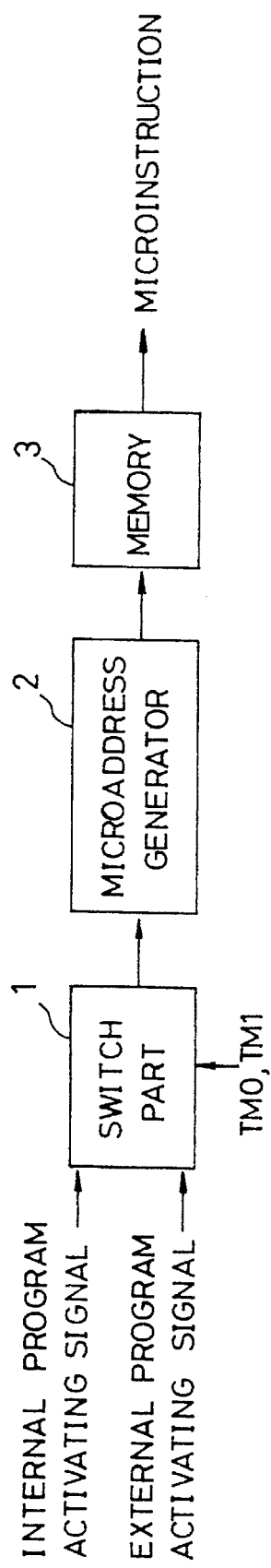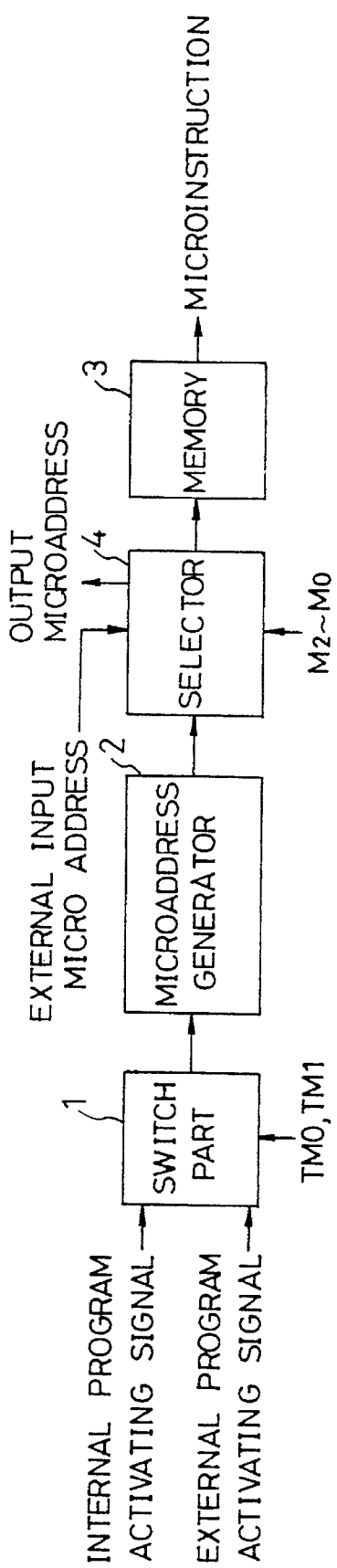

FIG. 5
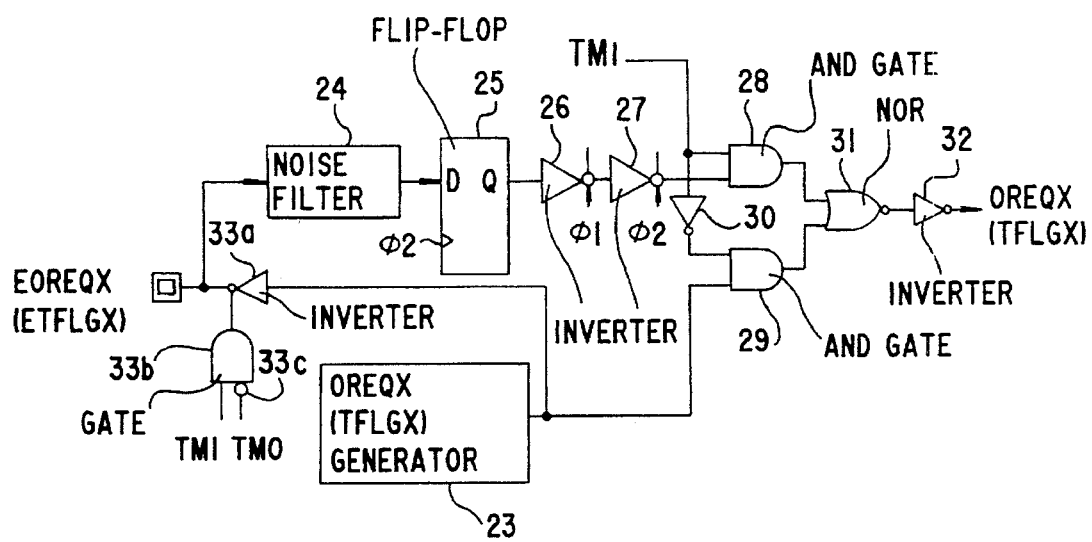
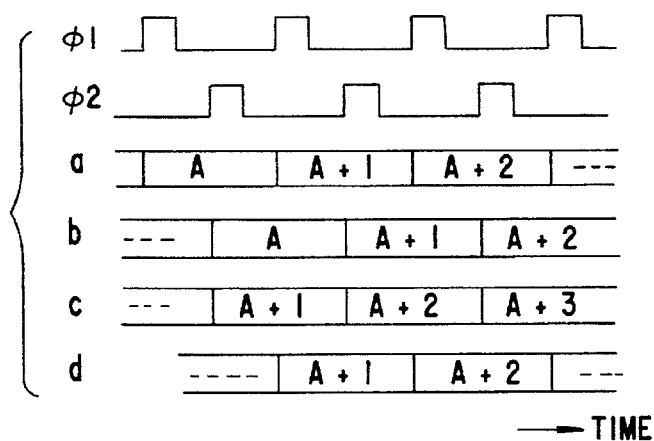
FIG. 7

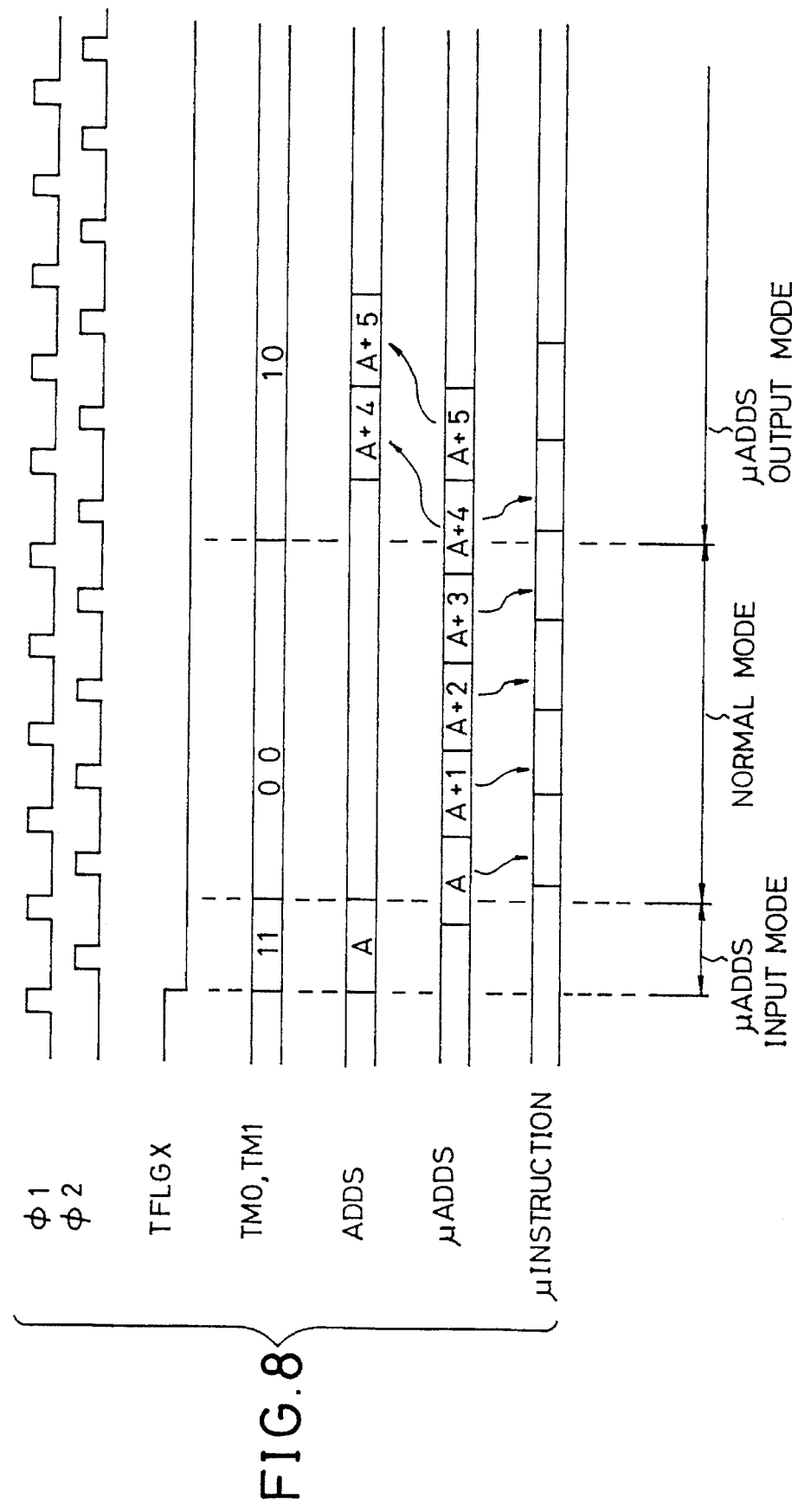

5,517,653

SEMICONDUCTOR INTEGRATED CIRCUIT DEVICE WHICH CONTROLS THE ACTIVATION OF A MICROPROGRAM AND THE START ADDRESS

This application is a continuation of application Ser. No. 327,475 filed Mar. 22, 1989 now abandoned.

BACKGROUND OF THE INVENTION

The present invention generally relates to a semiconductor integrated circuit device having a microprogram, and more particularly to a semiconductor integrated circuit device having a microprogram, which is suitably used for controlling a direct memory access transfer, for example.

Recently, it is required to transfer a large amount of data such as image data with extremely high speed between a data processing system such as a personal computer and a workstation, and an external unit such as a disc unit. It is also required to transfer a large amount of data between memories provided in the system with extremely high speed. A conventional data transfer is carried out under the control of a central processing unit (hereafter simply referred to as CPU) provided in the data processing apparatus. Therefore, the processing speed of the conventional data transfer depends on the processing speed of the CPU. From this viewpoint, it is impossible to transfer data at a speed in excess of the processing speed of the CPU. Further, it takes a long time to transfer a large amount of data even when the data is low-speed data. From the above-mentioned viewpoints, a direct memory access transfer is used which enables it to transfer data between the data processing unit, and the external unit without using the CPU. Hereafter, direct memory access is simply referred to as DMA. The DMA transfer is intended to effectively process a large amount of data and high-speed data.

The above-mentioned DMA transfer is controlled by a DMA controller, which is an example of semiconductor integrated circuit device having a microprogram. A DMA controller stores a microprogram for controlling the DMA transfer, and is generally fabricated as a large scale integrated circuit (hereafter simply referred to as LSI). Recent research and development of LSIs result in an increased integration density and extended functions.

At an initial step of the development of the DMA controllers, microprograms built therein were not complex. Therefore, it was easy to test LSIs. However, currently, a large amount of microprogram is stored in a memory formed in LSIs in order to present a variety of functions. For example, a DMA controller available in the market has a microprogram which consists of 384 (words)×80 (bit) words. In order to test all these words, all of the corresponding microaddresses must be supplied to the memory. It takes an extremely long time to test the microprogram in this way. Additionally, in the conventional DMA controllers, it is impossible to start the microprogram on the half-way thereof. Further, the conventional DMA controllers are not designed to output various control signals used in the DMA controller to an external circuit. It will be seen that a variety of tests are required as the functions extend. For these reasons, tests of the DMA controllers are complex and troublesome, and needs a large amount of time.

SUMMARY OF THE INVENTION

It is therefore a general object of the present invention to provide a novel and useful semiconductor integrated circuit device having a microprogram in which the aforementioned disadvantages are eliminated.

A more specific object of the present invention to provide a semiconductor integrated circuit device having a microprogram in which microprograms stored therein and functions can be tested with ease and increased speed.

The above objects of the present inventions can be achieved by a semiconductor integrated circuit device, comprising a memory means storing a microprogram used for controlling a desired function; a generating for generating an internal microprogram activating signal; a switching for selecting either one of an external microprogram activating signal generated by an external device and the internal microprogram activating signal generated by the generating device based on a first signal supplied from outside of the semiconductor integrated circuit device, thereby outputting a selected microprogram activating signal; and a microaddress generating for generating a microaddress of the microprogram stored in the memory, the microaddress generating device being activated by the selected microprogram activating signal.

Other objects, features and advantages of the present invention will become apparent from the detailed description when read in conjunction with the accompanying drawings.

BRIEF DESCRIPTION OF THE DRAWINGS

FIG. 1A is a block diagram of an essential part of the present invention;

FIG. 1B is a block diagram of another essential part of the present invention;

FIG. 5 is a block diagram illustrating an essential part of a request handler shown in FIG. 3;

FIG. 7 is a timing chart illustrating the operation of the microunit of FIG. 6 in a normal mode; and FIG. 8 is a timing chart illustrating the operation of the microunit of FIG. 6 in microaddress input and output modes.

DESCRIPTION OF THE PREFERRED EMBODIMENTS

A description is given of the principle of the present invention with reference to FIGS. 1A and 1B. Referring to these figures, a semiconductor integrated circuit device of FIG. 1A is made up of a switch part 1, a microaddress generator 2, and a memory 3. The switching part 1 receives an internal program activating signal and an external program activating signal, and selects one of the two signals based on control signal input/output switching signals TM0 and TM1 supplied from a device (not shown) such as a CPU. Hereafter, the control signal input/output control signals TM0 and TM1 are simply referred to as switch control signals. The internal program activating signal is generated in the semiconductor integrated circuit device, and the external program activating signal is generated by an external device such as the CPU. The selected program activating signal is supplied to the microaddress generator 2. The microaddress generator 2 generates a microaddress of the memory 3, which stores a microprogram consisting of a plurality of words (microcodes, or microinstructions). When the generated microaddress is supplied to the memory 3, the corresponding microinstruction is read out from the memory 3. It is to be noted that the memory 3 can be accessed by the external device which supplies the external program activating signal to the device. Thereby, it becomes possible to drive the microprogram step by step (a single step operation).

A device of FIG. 1B includes a selector 4 in addition to the elements shown in FIG. 1A. The selector 4, which is interposed between the microaddress generator 2 and the memory 3, selects one of the microaddress generated by the microaddress generator 2 and an external input microaddress supplied from a device such as the CPU based on an address bus use switching signal, which consists of three bits M2, M1 and M0. The use of the external input microaddress makes it possible to start the microprogram from an arbitrary address. Additionally, the selector 4 has a function of outward outputting the microaddress. Thereby, the actual sequence or flow of the microprogram can be monitored from the outside.

A description is given of a preferred embodiment of the present invention.

Figure 2:
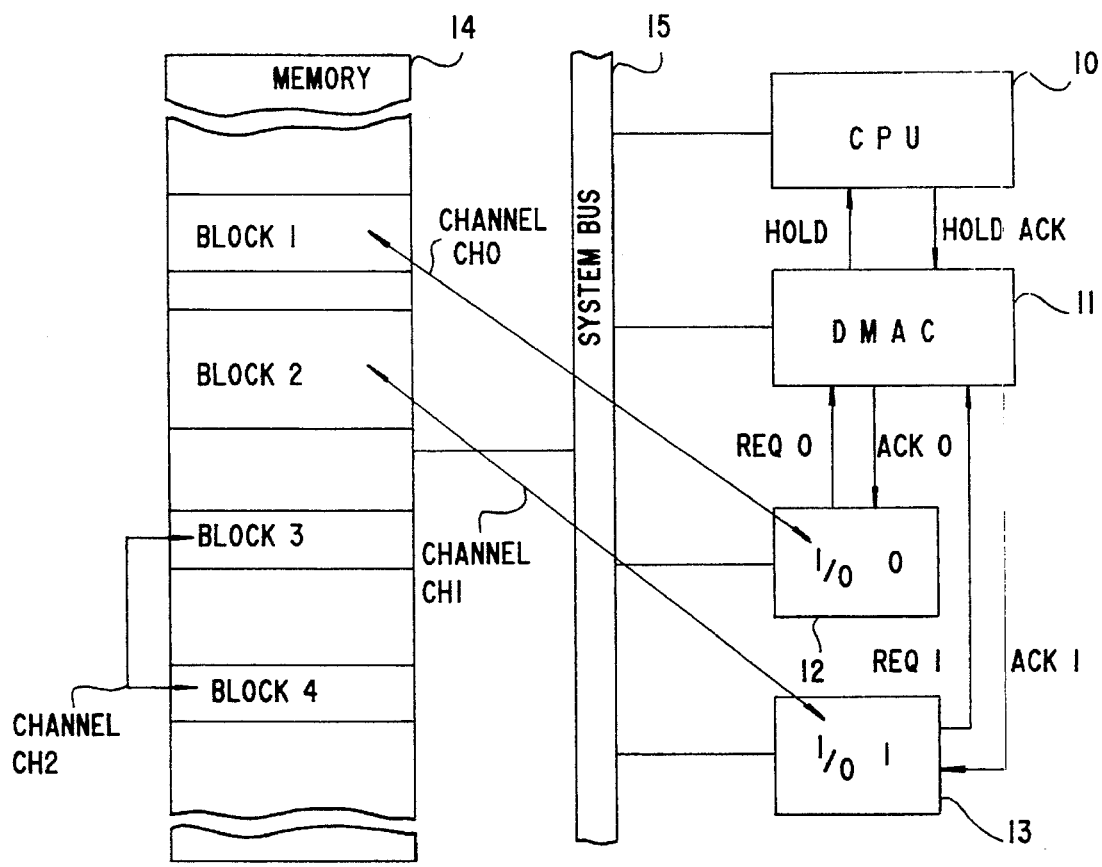
FIG. 2 is a block diagram of a system in which a direct memory access controller, which is a semiconductor integrated circuit device having a microprogram.

Referring to FIG. 2, a data processing system includes a central processing unit (hereafter simply referred to as CPU) 10, a direct memory access controller (hereafter simply referred to as DMAC) 11, two input/output ports (hereafter simply referred to as I/O ports) 12, 13, a memory 14, and a system bus 15, which includes an address bus, a data bus and a control bus. The I/O ports 12 and 13 are connected to external devices such as disc unit. In FIG. 2, three channels #0, #1 and #2 for the DMA transfer are illustrated. Channel #0 is associated with the data transfer between a block 1 of the memory 14 and the I/O port 12. Channel #1 is associated with the data transfer between a block 2 of the memory 14 and the I/O port 13. Channel #2 is associated with the data transfer between blocks 3 and 4 in the memory 14.

The data transfer by the DMA transfer is carried out as follows. It is now assumed that the CPU 10 is processing data while exclusively using the system bus 15. When a request for the data transfer associated with channel #1 occurs in the I/O port 12, for example, a request signal REQ0 is supplied to the DMAC 11. Then the DMAC 11 supplies the CPU 10 with a hold request signal HOLD to release the system bus 15 from the exclusive use by the CPU 10. When receiving the hold request signal HOLD, the CPU 10 sends a hold acknowledge signal HOLD ACK to the DMAC 11, and then transfers the bus using right to the DMAC 11. Thereby, the DMAC 11 can exclusively use the system bus 15, and is allowed to carry out the DMA transfer. Then the DMAC 11 sends a request acknowledge signal ACK0 to the I/O port 12.

Figure 3:
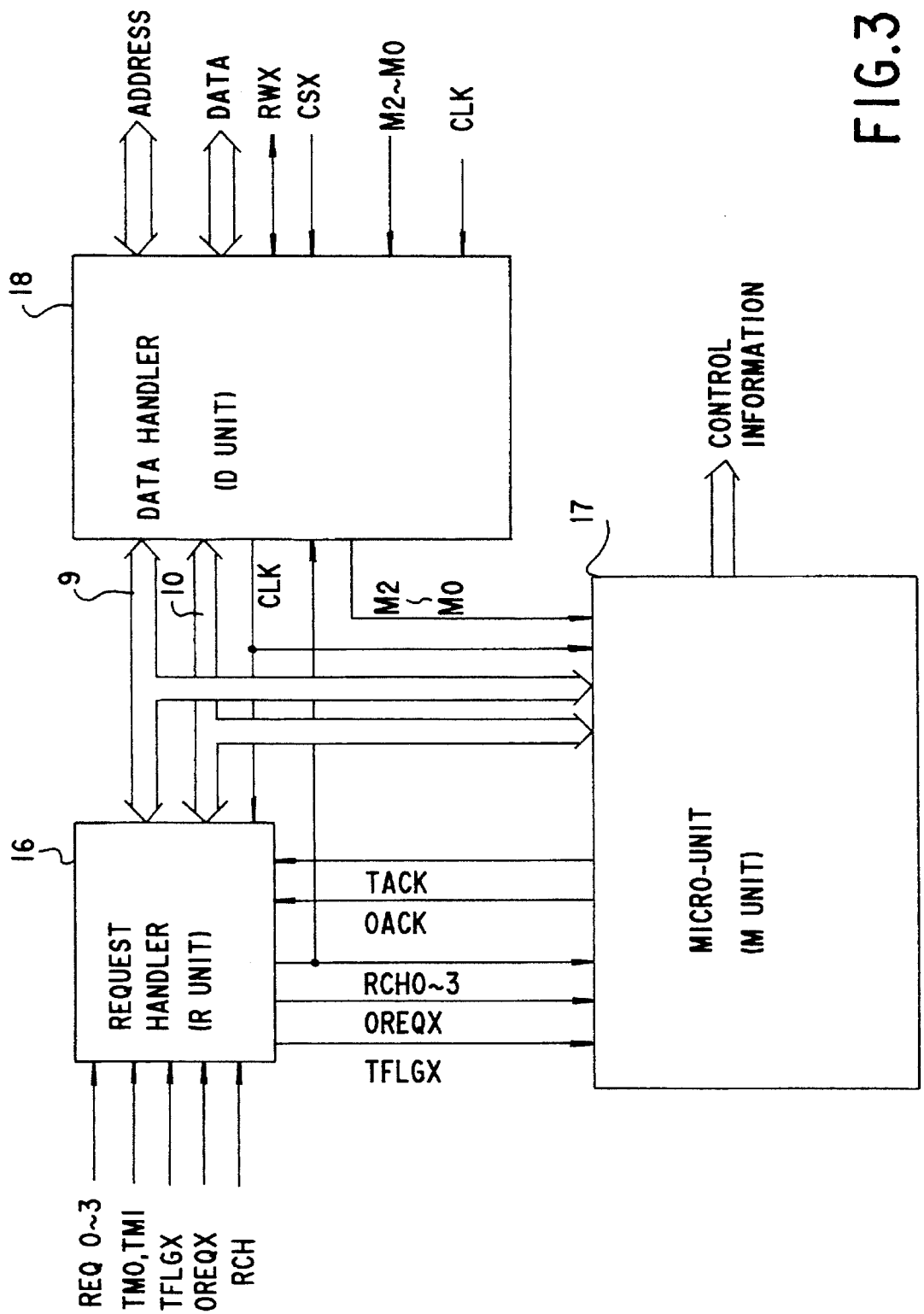
FIG. 3 is a block diagram illustrating the structure of a DMA controller.

FIG. 3 is a block diagram of the DMAC 11. Referring to FIG. 3, the DMAC 11 includes a request handler (hereafter simply referred to as R unit) 16, a microunit (hereafter simply referred to as M unit) 17, and a data handler (hereafter simply referred to as D unit) 18. The aforementioned switching part 1 is embodied by an internal circuit of the R unit 16. The microaddress generator 2, the memory 3 and the selector 4 are embodied by an internal circuit of the M unit 17.

Generally, the R unit 16 generates an internal request signal TFLGX and channel signals RCH0–RCH3, depending on transfer request signals REQ0–REQ3 supplied through the system bus 15 (in FIG. 3, only two transfer request signals REQ0 and REQ1 are illustrated). In addition, the R unit 16 makes a decision on priority over the transfer requests and supplies the M unit 17 and the like with a notice of the transfer request. The R unit 16 also generates the hold request signal HOLD to be supplied to the CPU 11.

The M unit 17 stores a microprogram in a memory provided therein. Further, the M unit 17 generates various microinstructions (control information), and supplies them to the R unit 16 and the D unit 18. The present invention mainly relates to the internal structure for the M unit 17 and the internal structure for the R unit 16.

The D unit 18 interfaces with the system bus 15, which is comprised of the address bus, data bus and control bus. The R unit 16, the M unit 17 and the D unit 18 are mutually connected by an internal address bus 9, an internal data bus 10 and a clock signal line CLK.

Figure 4:
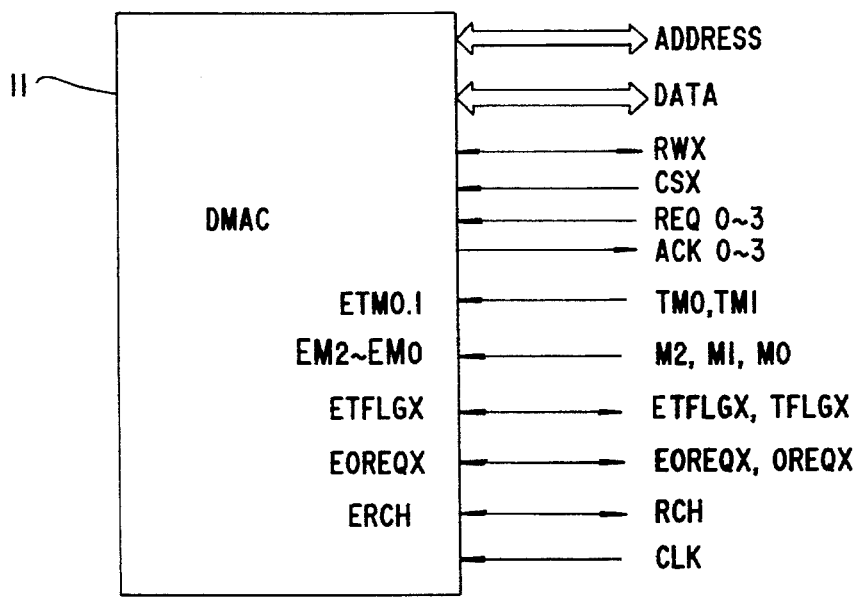
FIG. 4 is a view illustrating pins and signals to be applied thereto.

Referring to FIG. 4, the DMAC 11 may be formed as an LSI, lead pins of which are supplied with various signals including an address signal, a data signal and a read/write signal RWX. These signals are conventionally used. Additionally, lead pins of the DMAC 11 are supplied with the transfer request signals REQ0–REQ3, the acknowledge signals ACK0–ACK3, and a clock signal CLK. These signals are conventionally used. Further, the DMAC 11 has specific signal pins described below.

Input pins ETM0 and ETM1 are supplied with the switch control signals TM0 and TM1, respectively, which are used for controlling input/output of control signals TFLGX and OREQX. Input pins EM2–EM0 are supplied with the address bus use switching signals M2–M0, respectively, which are used for generating an instruction that the internal address bus 9 should be used for input/output of the microaddress, and an instruction that the internal address bus 9 should be used for input/output of addresses such as source address and destination address necessary for the normal DMA transfer.

Pins labelled ETFLGX and EOREQX are input/output pins, and supplied with external microprogram activating signals ETFLGX and EOREQX, respectively. Both the external microprogram activating signals ETFLGX and EOREQX are different from each other in the following. During a time when the external microprogram activating signal ETFLGX is kept at a low level ("L" level), the microprogram is kept in an activated state. When the external microprogram activating signal ETFLGX is switched to a high level ("H" level), the microprogram is changed to a waiting state. Therefore, the use of the external microprogram activating signal ETFLGX enables it to be possible to operate the microprogram in the aforementioned single step mode.

On the other hand, the external microprogram activating signal EOREQX is a single pulse of negative polarity which has a width amounting to one clock cycle. Once the external microprogram activating signal EOREQX is applied to the DMAC 11, the microprogram continues to run until a microinstruction is obtained by detecting a microinstruction end signal μEND generated at the end of the microprogram. That is, it is impossible to stop running the microprogram on the half way thereof. In operation, either one of the two external microprogram activating signals ETFLGX and EOREQX is selectively used.

As will be described later, signals identical to the above-mentioned microprogram activating signals ETFLGX and EOREQX, called internal microprogram activating signals ETFLGX and OREQX are generated in the DMAC 11. The internal microprogram activating signals TFLGX and OREQX generated in the DMAC 11 are output through the input/output pins ETFLGX and EOREQX, respectively. In the normal operation, the internal microprogram activating signals TFLGX and OREQX are used. A pin labelled ERCH is an input/output pin, which is supplied with the channel signal RCH.

As shown in Table 1, the DMAC 11 is designed to have a plurality of modes depending on values of the switch control signals TM0 and TM1.

TABLE 1

| TM0 | TM1 | Mode |
|-----|-----|------|
| 0 | 0 | Normal mode |
| 0 | 1 | |
| 1 | 0 | Control signal output mode |
| 1 | 1 | Control signal input mode |

In Table 1, "normal mode" is an operating mode in which the DMAC 11 carries out the normal DMA transfer.

As shown in Table 2, the DMAC 11 also operates in the following modes depending on values of the address bus use switching signals M2–M0.

TABLE 2

| M2 | M1 | M0 | Mode |
|----|----|----|------|
| 0 | x | x | Normal Mode |
| 1 | x | 1 | Microaddress output mode |
| 1 | 1 | x | Microaddress input mode |

In Table 2, "x" denotes "don't care", which means that a value may be "1" or "0". The address bus use switching signals M2–M0 are supplied to the M unit 17 through the D unit 18 as shown in FIG. 3.

A description is given of the structure of the R unit 16. FIG. 5 is a block diagram of a part of the structure for the R unit 16. Referring to FIG. 5, an OREQX generator 23 generates the internal microprogram activating signal OREQX. The output terminal of the OREQX generator 23 is connected to the input/output pin EOREQX of the DMAC 11 through an inverter 33a. The inverter 33a is controlled by an output of an AND gate 33b, to which the switch control signal TM1 is directly supplied and the other signal TM0 is supplied through an inverter 33c. The output terminal of the OREQX generator 23 is also connected to an AND gate 29. The noise filter 24 is connected to the input/output terminal EOREQX. Further, the illustrated structure includes a D-type flip-flop 25, two clocked inverters 26 and 27, inverters 30 and 32, AND gates 28 and 29, and a NOR gate 31. Internal clocks $\phi_1$ and $\phi_2$ are no-over clocks, which is generated from the clock signal CLK by a no-over clock generator (not shown) provided in the R unit 16. Such a generator is also provided in each of the M unit 17 and the D unit 18.

The external microprogram activating signal applied to the pin EOREQX of the DRAM 11, is wave-shaped, and is then supplied to the D-terminal of the flip-flop 25 served as data input terminal. The flip-flop 25 latches the signal in synchronism with the internal clock $\phi_2$. After that, the latched external microprogram activating signal is supplied to an input terminal of the AND gate 28 through the clocked inverters 26 and 27.

The switch control signal TM1 is supplied to the other input terminal of the AND gate 28, and also the other input terminal of the AND gate 29 through an inverter 30. Therefore, either one of the AND gates 28 and 29 is always kept in the open state, and the other AND gate is always kept in the closed state. As can be seen from Table 1, the AND gate 29 is kept open in the normal mode. Thereby, the internal microprogram activating signal OREQX passes through the AND gate 29. In other cases, that is, in the control signal output mode and the control signal input mode, the external microprogram activating signal OREQX passes through the AND gate 28. The selected one of the microprogram activating signals EOREQX and OREQX passes through the NOR gate 31 and the inverter 32, in which the selected signal is phase-inverted two times. In this manner, one of the internal and external microprogram activating signals OREQX and EOREQX is selectively output, and supplied to the M unit 17 shown in FIG. 3 as the microprogram activating signal OREQX.

The R unit 16 also has the structure identical to that of FIG. 5 with respect to the microprogram activating signal OREQX. Of course, a TFLGX generator is substituted for the OREQX generator 23. Either one of the external microprogram activating signal ETFLGX and the internal microprogram activating signal TFLGX generated by the TFLGX generator is supplied, as the microprogram activating signal TFLGX, to the M unit 17 shown in FIG. 3.

Figure 6:
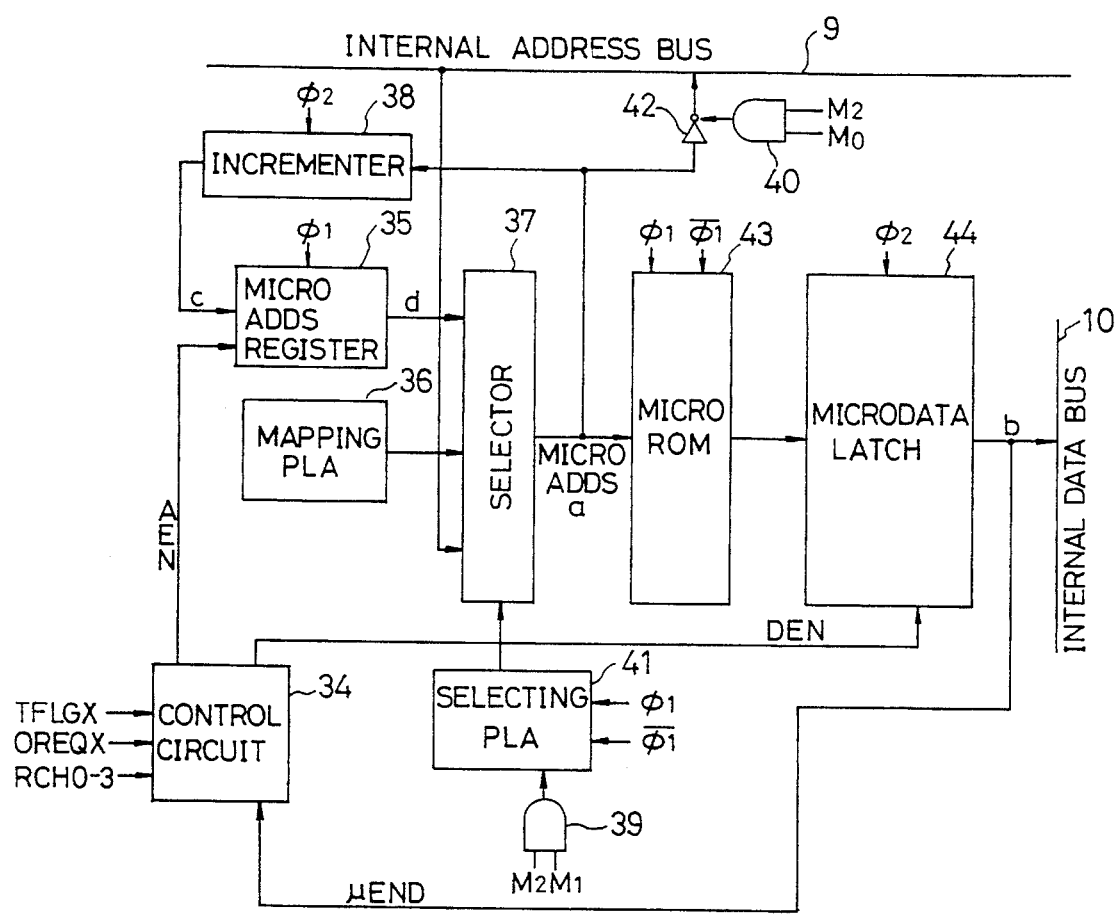
FIG. 6 is a block diagram of a microunit which is a part of the DMA controller.

A description is given of the structure for the M unit 17 with reference to FIG. 6, which shows an essential part of the M unit 17. Referring to FIG. 6, a control circuit 34 is provided with the microprogram activating signals OREQX and TFLGX, the channel signals RCH0–RCH3, and the microinstruction end signal μEND, and produces an address enable signal AEN and a data enable signal DEN with predetermined timings. The control circuit 34 is a conventional circuit, which is made up of a flip-flop set by the microprogram activating signal OREQX, for example, and an OR circuit which carries out an OR operation on the output signal of the flip-flop and the microprogram activating signal TFLGX.

A microaddress register 35 latches the output signal of an incrementer 38 with a timing of the internal clock $\phi_1$ during a time when the address enable signal AEN is input. A mapping programmable logic array (hereafter simply referred to as mapping PLA) 36 is kept activated in the normal mode, and generates the start (activating) address of the microprogram. A selector 37 selects one of the output of the microaddress register 35, the output of the mapping PLA 36, and an address signal supplied from the address bus 9. The incrementer 38 adds a value of '1' to the address value output by the selector 37, and outputs a renewed address. The output terminal of the selector 37 is coupled to the address bus through an inverter 42. An AND gate 40 is supplied with the address bus use switching signals M2 and M0. The AND operation result is supplied to the inverter 42.

The selector 37 is controlled by a selecting PLA 41, which is supplied with the internal clock signals $\phi_1$ and $\bar{\phi}_1$, and an output signal of an AND gate 39. The address bus use switching signals M2 and M1 are supplied to the AND gate 39.

The selected microaddress is supplied to a micro-ROM 43, which operates in synchronism with the internal clock signals $\phi_1$ and $\bar{\phi}_1$. The micro-ROM 43 stores a microprogram. A microdata latch element 44 latches the output of the micro-ROM in response to the data enable signal DEN supplied from the control circuit 34, and the internal clock signal $\phi_2$. The microinstruction end signal μEND is supplied to the control circuit 34 through the microdata latch element 44.

The aforementioned selector 4 shown in FIG. 1B corresponds to the combination of the selector 37, the AND gates 39, 40, the selecting PLA 41 and the inverter 42. The micro-ROM 43 corresponds to the memory 3 shown in FIGS. 1A and 1B. The micro-ROM 43 is precharged in synchronism with the internal clock signal $\phi_1$, and is discharged in synchronism with the internal clock signal $\bar{\phi}_1$.

A description is given of operation of the embodiment.

Normal Mode

In the normal mode, the address bus use switching signal M2 is '0' as shown from Table 2. Therefore, the output signals of both the AND gates 39 and 40 are "L" level. Thereby, the selecting PLA 41 selects the output signal of the microaddress register 35, and on the other hand, the output signal of the inverter 42 is kept at a fixed level (actually closed state).

The microaddress selected from the selector 37 (this is the output address of the mapping PLA 36 when activated) is supplied to the micro-ROM 43, and the corresponding microinstruction of the microprogram is read out therefrom. The read-out microinstruction (microdata) is latched in the microdata latch element 44 with timing of the internal clock $\phi_2$, and is thereafter supplied, as control information for the normal DMA transfer, to the internal data bus 10. The latched microinstruction is also supplied to the control circuit 34.

The microaddress from the selector 37 is also supplied to the incrementer 38. It is now assumed that in FIGS. 6 and 7, the microaddress is represented as 'a', and the value thereof (microdata) is represented as 'A'. The latched microdata 'b' is shown in FIG. 7. As illustrated, the microdata 'A' is latched at the rise of the internal clock $\phi_2$. The output signal of the incrementer 38, 'c' is shown in FIG. 7. As shown, the incrementer 38 generates the value of the microaddress (A+1), which is generated by adding '1' to the microaddress value 'a' at the rise of the internal clock $\phi_2$. The output signal 'c' of the incrementer 38 is supplied to the microaddress register 35, which latches the output signal 'c' at the rise of the internal clock $\phi_1$. The output signal 'd' of the microaddress register 35 is illustrated in FIG. 7. In this manner, the above-mentioned operation is repetitively carried out, so that one microaddress 'a' which is incremented by 1 for every one cycle period, is available from the selector 37.

Microaddress Output Mode

When the microaddress output mode is selected, the address bus use switching signals M2 and M0 are '1'. Therefore, the output signal of the AND gate 40 is "H" level, and the inverter 42 is kept in the operating state. The selecting PLA 41 outputs the selection switching signal identical to that used at the time when the normal mode is selected.

If the microprogram activating signal to be supplied to the control circuit 34 is the signal TFLGX, the control circuit 34 continues to output the address enable signal AEN to the microaddress register 35 during the time when the signal TFLGX is kept at "L" level. Additionally, the control circuit 34 outputs the data enable signal DEN with a delay amounting to half of clock period from the generation of the address enable signal AEN. This is because the generation timing for the microaddress does not coincide with the data output timing for the micro-ROM 43. In this manner, the microaddress 'a' which is incremented by '1' for every one cycle period, is obtained from the selector 37 during the time when the microaddress activating TFLGX is at "L" level. The microaddress is supplied to the micro-ROM 43 and also to a device connected to the system bus 15 through the inverter 42, the internal address bus 9, and the D unit 18 (FIG. 3). Therefore, in the microaddress output mode, it becomes possible to carry out the single step operation of the microprogram and the like by selecting a suitable timing at which the microprogram activating signal TFLGX is switched to "L" level.

On the other hand, if the microprogram activating signal supplied to the DMAC 11 from the outside is the signal OREQX (single pulse), the control circuit 34 continuously outputs the address enable signal AEN and the data enable signal DEN until the microinstruction end signal μEND is derived from the microdata latch element 44. Thereby, the microprogram continues to run until the end thereof. During this time, the microaddress changes as in the normal mode, and is outward output as in the case where the microprogram activating signal TFLGX is input. As a result, in the microaddress output mode, it becomes possible to monitor the flow of the microprogram from the outside by tracing the microaddress output from the DMAC 11 by using a logic analyser or the like.

Microaddress Input Mode

In the microaddress input mode, the address bus use switching signals M2 and M1 are '1'. Therefore, the output signal of the AND gate 39 is "H" level, and thereby the selecting PLA 41 outputs a signal which makes it for the selector 37 to select the external input microaddress supplied from the internal bus through the D unit 18. At this time, the output signal of the AND circuit 40 is at "L" level, and the output signal of the inverter 42 is kept at the fixed level.

Thereby, in the microaddress input mode, it is possible to supply an arbitrary microaddress to the micro-ROM 43 and the incrementer 38 through the system bus 15, the D unit 18, the internal address bus 9, and the selector 37. As a result, the microprogram can be started from an arbitrary microaddress.

The external input microaddress is incremented by 1 by the incrementer 38, and is supplied to the selector 37 through the microaddress register 35. During this cycle, the address bus use switching signal M2 and M1 are changed to '0'. Therefore, the selector 37 passes the output signal of the microaddress register 35, and then the microaddress is successively incremented by 1 as in case of the normal mode. In this manner, the microprogram can be activated from an arbitrary microaddress. It is to be noted that generally, a microprogram is a group consisting of a plurality of independent microprograms, and therefore it is very advantageous to directly and separately access and test the individual microprograms.

FIG. 8 is a timing chart of an example of operation. As shown, the microprogram activating signal TFLGX is switched to "L" level. The switch control signals TM0 and TM1 are changed in an order of '1, 1', '0, 0', and '1, 0'. When both the switch control signals TM0 and TM1 are set equal to '1' (control signal input mode), it is assumed the address bus use switching signals M2 and M1 are set equal to '1'. At this time, an external microaddress A is supplied to the micro-ROM 43 through the selector 37, which selects the internal address bus 9. Then, the microinstructions (microdata or microcode) relating to the external microaddress A is read out from the micro-ROM 43, and supplied to the data bus of the system bus 15 through the microdata latch element 44 and the D unit 18. The external microaddress A is also supplied to the incrementer 38 through the selector 37, and is then set therein.

Thereafter, when the switch control signal TM0 and TM1 are switched to '0' (normal mode), it is assumed that the address bus use signals M2 is set equal to '0'. Therefore, the incrementer 38 sequentially increments the count value by 1 from the microaddress A, during the time when the address bus use signals TM0 and TM1 are set equal to '0'. Then the corresponding microinstructions are output.

Thereafter, when the address bus use signals TM0 and TM1 are set equal to '1' and '0', respectively (control signal output mode), it is assumed that the address bus use switching signals M2 and M0 are set equal to '1'. As a result, the microaddress generated in the incrementer 38 is output to the internal address bus 9 through the inverter 42, and supplied to the address bus of the system bus 15 through the D unit 18. In the illustrated example, the microaddress is output from microaddress A+4.

Table 3 shows incrementer test patterns which may be suitably used for testing the incrementer 43.

TABLE 3

| No | A8 | A7 | A6 | A5 | A4 | A3 | A2 | A1 | A0 |
|----|----|----|----|----|----|----|----|----|----|
| 1  | 1  | 1  | 1  | 1  | 1  | 1  | 1  | 1  | 1  |
| 2  | 0  | 0  | 0  | 0  | 0  | 0  | 0  | 0  | 0  |
| 3  | 0  | 0  | 0  | 0  | 0  | 0  | 0  | 0  | 1  |
| 4  | 0  | 0  | 0  | 0  | 0  | 0  | 0  | 1  | 1  |
| 5  | 0  | 0  | 0  | 0  | 0  | 0  | 1  | 1  | 1  |
| 6  | 0  | 0  | 0  | 0  | 0  | 1  | 1  | 1  | 1  |
| 7  | 0  | 0  | 0  | 0  | 1  | 1  | 1  | 1  | 1  |
| 8  | 0  | 0  | 0  | 1  | 1  | 1  | 1  | 1  | 1  |
| 9  | 0  | 0  | 1  | 1  | 1  | 1  | 1  | 1  | 1  |
| 10 | 0  | 1  | 1  | 1  | 1  | 1  | 1  | 1  | 1  |
| 11 | 0  | 0  | 0  | 0  | 0  | 0  | 0  | 1  | 0  |
| 12 | 0  | 0  | 0  | 0  | 0  | 0  | 1  | 0  | 0  |
| 13 | 0  | 0  | 0  | 0  | 0  | 1  | 0  | 0  | 0  |
| 14 | 0  | 0  | 0  | 0  | 1  | 0  | 0  | 0  | 0  |
| 15 | 0  | 0  | 0  | 1  | 0  | 0  | 0  | 0  | 0  |
| 16 | 0  | 0  | 1  | 0  | 0  | 0  | 0  | 0  | 0  |
| 17 | 0  | 1  | 0  | 0  | 0  | 0  | 0  | 0  | 0  |
| 18 | 1  | 0  | 0  | 0  | 0  | 0  | 0  | 0  | 0  |

The incrementer test patterns Nos. 1 to 10 are used for turning OFF all the bits of the microaddress to be output. The incrementer test patterns Nos. 11 to 18 are used for turning ON all the bits of the microaddress to be input. The embodiment enables it to be possible to use the above-mentioned reduced number of incrementer test patterns. That is, according to the embodiment, it becomes possible to test all the combinations of bits of the microaddress by using 18 incrementer test patterns shown in Table 3. It is noted that in the conventional DMAC, test patterns corresponding all the combinations of bits of the microaddress (in the case of the aforementioned example, 512×2 patterns in total for microaddress inputting and outputting) must be used for the test of the incrementer.

The present invention is not limited to the above-mentioned DMAC, and includes any semiconductor integrated circuit device which controls the activation of the microprogram and the start microaddress.

The present invention is not limited to the aforementioned embodiments, and variations and modifications may be made without departing from the scope of the invention.

What is claimed is:

1. A semiconductor integrated circuit device, comprising:
   an internal circuit controlled by a microprogram;
   memory means for storing said microprogram;
   generating means for generating an internal microprogram activating signal which activates said microprogram;
   receiving means for receiving an external microprogram activating signal which is generated by an external device and which activates said microprogram;
   first switching means for selecting one of said external microprogram activating signal and said internal microprogram activating signal based on a first signal supplied from outside of said semiconductor integrated circuit device, therein outputting a selected microprogram activating signal, said first switching means selects said internal microprogram activating signal in a normal mode of said internal circuit and said first switching means selects said external microprogram activating signal in a test mode of the internal circuit;
   second switching means for selecting either one of an external microaddress generated by an external device and said microaddress generated by said microaddress generating means based on a second signal, therein supplying a selected microaddress to said memory means, said second switching means for selecting said microaddress generated by said microaddress generating means in said normal mode of said internal circuit and for selecting said external input microaddress in said test mode of said internal circuit wherein a test is performed by activating the microprogram from an arbitrary microaddress; and
   microaddress generating means for generating a microaddress of said microprogram stored in said memory means, said microaddress generating means being activated by said selected microprogram activating signal.

2. A semiconductor integrated circuit device as claimed in claim 1, further comprising means for outputting said microaddress generated by said microaddress generating means outside of the semiconductor integrated circuit device.

3. A semiconductor integrated circuit device as claimed in claim 2, said means for outputting said microaddress comprises a logic gate which is controlled by said second signal, and has an input and an output, and wherein the input of said logic gate is coupled to said microaddress generating means, and said microaddress generated by said microaddress generating means is output outside of the semiconductor integrated circuit device through the output of said logic gate.

4. A semiconductor integrated circuit device as claimed in claim 3, further comprising an internal address bus coupled to said logic gate and said external device, wherein said logic gate comprises a clocked inverter having an input coupled to said microaddress generating means, and an output coupled to said internal address bus, and a gate which controls said clocked inverter based on said second signal.

5. A semiconductor integrated circuit device as claimed in claim 1, further comprising means for outputting said internal microprogram activating signal generated by said generating means outside of the semiconductor integrated circuit device.

6. A semiconductor integrated circuit device as claimed in claim 1, further comprising a first input/output pin through which said external microprogram activating signal is supplied to said first switching means and through which said internal microprogram activating signal is output outside of said semiconductor integrated circuit device.

7. A semiconductor integrated circuit device as claimed in claim 6, further comprising a logic circuit which is interposed between said generating means and said input/output pin and passes said internal microprogram activating signal generated by said generating means at a predetermined time when said first signal is switched to a predetermined state.

8. A semiconductor integrated circuit device as claimed in claim 7, wherein said predetermined time is a time ranging from activation of said microprogram and end thereof.

9. A semiconductor integrated circuit device as claimed in claim 1, wherein each of said external and internal microprogram activating signals includes a first microprogram activating signal which makes said microprogram active.

10. A semiconductor integrated circuit device as claimed in claim 1, wherein each of said external and internal microprogram activating signals includes a second microprogram activating signal which is a pulse signal having one clock width, which activates the microprogram step by step.

11. A semiconductor integrated circuit device as claimed in claim 1, wherein said second switching means comprises a selector which is controlled by said second signal and has first and second inputs and an output, said first input being connected to said microaddress generating means, said second input being provided with said external input microaddress, said output being connected to said memory means.

12. A semiconductor integrated circuit device as claimed in claim 11, further comprising an internal address bus connected to said second input of said selector, and said external input microaddress signal being supplied to said selector through said internal address bus.

13. A semiconductor integrated circuit device as claimed in claim 12, wherein said microaddress generating means comprises a microaddress register which is activated by said selected microprogram activating signal and which has an input and an output, said output being connected to the first input of said selector, and an incrementer having an input and an output, the input of said incrementer being connected to the output of said selector, the output of said incrementer being connected to the input of said microaddress register.

14. A semiconductor integrated circuit device as claimed in claim 11, wherein said second switching means further comprises a logic gate for receiving said second signal, therein producing a logic signal, and a programmable logic array which generates a switching signal used for controlling switching of said based on said logic signal.

15. A semiconductor integrated circuit device as claimed in claim 1, wherein said second switching means for outputting said microaddress generated by said microaddress generating means outside of the semiconductor integrated circuit device.

16. A semiconductor integrated circuit device as claimed 15, wherein said arbitrary microaddress is supplied, as said external input microaddress, to said memory means, so that the microprogram stored in said memory means is started from said arbitrary microaddress, and a corresponding microprogram read out of said arbitrary microaddress, is output outside of the semiconductor integrated circuit device, so that a desired text is made by monitoring said output microaddress.

17. A semiconductor integrated circuit device as claimed in claim 1, wherein said arbitrary microaddress is supplied, as said external input microaddress, to said memory means, so that the microprogram stored in said memory means is started from said arbitrary microaddress.

18. A semiconductor integrated circuit device as claimed in claim 1, wherein said semiconductor integrated circuit device is a direct memory access controller used for controlling a data transfer by a direct memory access between devices coupled to a system bus to which said direct memory access controller is also coupled.

19. A semiconductor integrated circuit device, which is a direct memory access controller used for controlling a data transfer by a direct memory access between devices coupled to a system bus to which the direct memory access controller is also coupled, said semiconductor integrated circuit device comprising:

an internal circuit controlled according to a microprogram;

memory means for storing said microprogram;

generating means for generating an internal microprogram activating signal which activates said microprogram;

receiving means for receiving an external microprogram activating signal which is generated by an external device and which activates said microprogram;

first switching means for selecting one of said external microprogram activating signal and said internal microprogram activating signal based on a first signal supplied from outside of said semiconductor integrated circuit device, therein outputting a selected microprogram activating signal, said first switching means selects said internal microprogram activating signal in a normal mode of said internal Circuit and said first switching means selects said external microprogram activating signal in a test mode of the internal circuit;

second switching means for selecting either one of an external microaddress generated by an external device and said microaddress generated by said microaddress generating means based on a second signal, therein supplying a selected microaddress to said memory means, said second switching means for selecting said microaddress generated by said microaddress generating means in said normal mode of said internal circuit and for selecting said external input microaddress in said test mode of said internal circuit wherein a test is performed by activating the microprogram from an arbitrary microaddress; and microaddress generating means for generating a microaddress of said microprogram stored in said memory means, said microaddress generating means being activated by said selected microprogram activating signal.

* * * * *

UNITED STATES PATENT AND TRADEMARK OFFICE
CERTIFICATE OF CORRECTION

PATENT NO. : 5,517,653

DATED : May 4, 1996

INVENTOR(S) : Taniai et al

It is certified that error appears in the above-indentified patent and that said Letters Patent is hereby corrected as shown below:

On the title page, insert

Item [54], lines 1-4, please delete "SEMICONDUCTOR INTEGRATED CIRCUIT DEVICE WHICH CONTROLS THE ACTIVATION OF A MICROPROGRAM AND THE START ADDRESS" insert therefor -- SEMICONDUCTOR INTEGRATED CIRCUIT DEVICE WHICH CONTROLS THE ACTIVATION OF A MICROPROGRAM AND THE START MICROADDRESS --.

Signed and Sealed this

Twenty-fourth Day of December, 1996

*Attest:*

BRUCE LEHMAN

*Attesting Officer*  *Commissioner of Patents and Trademarks*